(12) United States Patent
Chin et al.

(10) Patent No.: US 7,100,235 B2
(45) Date of Patent: Sep. 5, 2006

(54) AUTOMATIC AIR-BLOWN CLEANING DEVICE FOR LIQUID CRYSTAL DISPLAY COMPONENT IN LCD ASSEMBLY AND METHOD THEREOF

(75) Inventors: I-Min Chin, Shinjuang (TW); Chien-Wen Lai, Taoyuan County (TW)

(73) Assignee: Quanta Display Inc., Tao Yuan Hsien (TW)

( * ) Notice: Subject to any disclaimer, the term of this patent is extended or adjusted under 35 U.S.C. 154(b) by 325 days.

(21) Appl. No.: 10/618,532

(22) Filed: Jul. 11, 2003

(65) Prior Publication Data

US 2004/0135963 A1 Jul. 15, 2004

(30) Foreign Application Priority Data

Jan. 9, 2003 (TW) .............................. 92100396 A

(51) Int. Cl.
*B08B 5/02* (2006.01)
(52) U.S. Cl. .................. 15/306.1; 15/309.2; 15/345; 15/346
(58) Field of Classification Search .................. 15/301, 15/306.1, 309.2, 316.1, 345, 346
See application file for complete search history.

(56) References Cited

U.S. PATENT DOCUMENTS

| | | | | |
|---|---|---|---|---|
| 4,164,430 A | * | 8/1979 | Reinwald et al. | 134/13 |
| 5,265,298 A | * | 11/1993 | Young | 15/1.51 |
| 5,351,354 A | * | 10/1994 | Hasumi et al. | 15/1.51 |
| 6,192,547 B1 | * | 2/2001 | Song | 15/308 |

* cited by examiner

*Primary Examiner*—Michael Barr
*Assistant Examiner*—Saeed Chaudhry
(74) *Attorney, Agent, or Firm*—Thomas, Kayden, Horstemeyer & Risley

(57) ABSTRACT

An automatic air-blown cleaning apparatus for cleaning a liquid crystal display (LCD) component in an LCD assembly process. The automatic air-blown cleaning apparatus has an assembly station for receiving and assembling the liquid crystal display component, a conveying device for delivering the liquid crystal display component to the next assembly station, and an air filtering blower provided on the conveying device. The air filtering blower sends an air flow toward the liquid crystal display component to remove residual matter from the liquid crystal display component.

5 Claims, 4 Drawing Sheets

AUTOMATIC AIR-BLOWN CLEANING DEVICE FOR LIQUID CRYSTAL DISPLAY COMPONENT IN LCD ASSEMBLY AND METHOD THEREOF

BACKGROUND OF THE INVENTION

1. Field of the Invention

The present invention relates to an automatic air-blown cleaning apparatus for liquid crystal display (LCD) components in LCD assembly.

2. Description of the Related Art

In recent years, display manufacturing techniques have improved rapidly. Various displays, such as cathode ray tube (CRT) displays and liquid crystal displays (LCDs), are commonly used. The LCD is lighter and occupies less space than the conventional CRT, and has been widely developed and applied in computers and communication devices, such as digital cameras and video cameras, notebooks, mobile phones, and the like.

Generally, an LCD includes a liquid crystal panel and a backlight module. The liquid crystal panel provides the display function of the LCD. Since the liquid crystal panel does not emit light, light with sufficient brightness and uniform distribution is required by the liquid crystal panel to properly display images. The backlight module provides the light source for the LCD.

In LCD assembly, a circuit module, e.g. a driving IC and a signal circuit board on the liquid crystal panel is applied on the liquid crystal panel. Then, a cutter is used to trim the liquid crystal panel with the circuit module thereon to a suitable size for the LCD. The trimmed liquid crystal panel is then delivered to a backlight assembly station for further assembly.

However, since the liquid crystal panel is delivered and cut several times in the manufacturing process, it is reasonable that residual matter, such as cut pieces and particles, may remain on the liquid crystal panel. Static electricity might also occur in the liquid crystal panel due to friction or electrostatic induction, induced by the electrostatic absorptive properties of the residual matter. When residual matter is not removed, defects may occur in the LCD assembly, thus reducing the display quality of the LCD.

Further, similar problems may occur in the backlight module. In assembly or delivery, residual matter might remain on the membranes of the backlight module, which reduce the brightness and uniform distribution of emitted light. When the residual matter remain is not removed from the membranes, defects may occur in the LCD assembly, thus reducing the display quality of the LCD.

Conventionally, in order to solve the problem of the residual matter, the liquid crystal panel and the backlight module are manually cleaned with a cleaning device, such as a brush or a cloth. However, such a cleaning process cannot be effectively controlled, and this reduces the efficiency and increases costs and time required for LCD assembly.

SUMMARY OF THE INVENTION

Accordingly, an object of the present invention is to provide an automatic air-blown cleaning apparatus for LCD components in LCD assembly, so that residual matter from LCD components, such as the liquid crystal panel or the backlight membrane, can be removed automatically while traveling on a conveyer.

The present invention discloses an automatic air-blown cleaning apparatus for LCD components in the LCD assembly process. The automatic air-blown cleaning apparatus has an assembly station for receiving and assembling the liquid crystal display components, a conveying device for delivering the liquid crystal display component to the next assembly station, and an air filtering blower provided on the conveying device. The air filtering blower sends an air flow toward the liquid crystal display component to remove residual matter from the liquid crystal display component.

Preferably, the air filtering blower has a filter, a high efficiency colander at a side of the filter, a blowing device at an opposite side of the high efficiency colander, an outlet provided at an outgoing end of the air filtering blower for sending the air flow toward the liquid crystal display component, and an inlet provided at an incoming end of the air filtering blower for receiving and circulating the air flow to the filter. Thus, the air flow is blown along a circulation path formed by the inlet, the filter, the high efficiency colander, the blowing device and the outlet.

Further, the present invention discloses a method of cleaning a liquid crystal display (LCD) component for LCD assembly. The method includes the steps of providing the liquid crystal display component for assembly, disposing the liquid crystal display component on a conveying device with an air filtering blower thereon, sending the liquid crystal display component through the air filtering blower to remove residual matter from the liquid crystal display component with an air flow blown by the air filtering blower, and sending the liquid crystal display component to the next assembly station for further assembly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

An embodiment of the automatic air-blown cleaning apparatus for cleaning a liquid crystal display (LCD) component in the LCD assembly process of the present invention is hereinafter described in detail with reference to FIG. 1 to FIG. 3.

Figure 1:
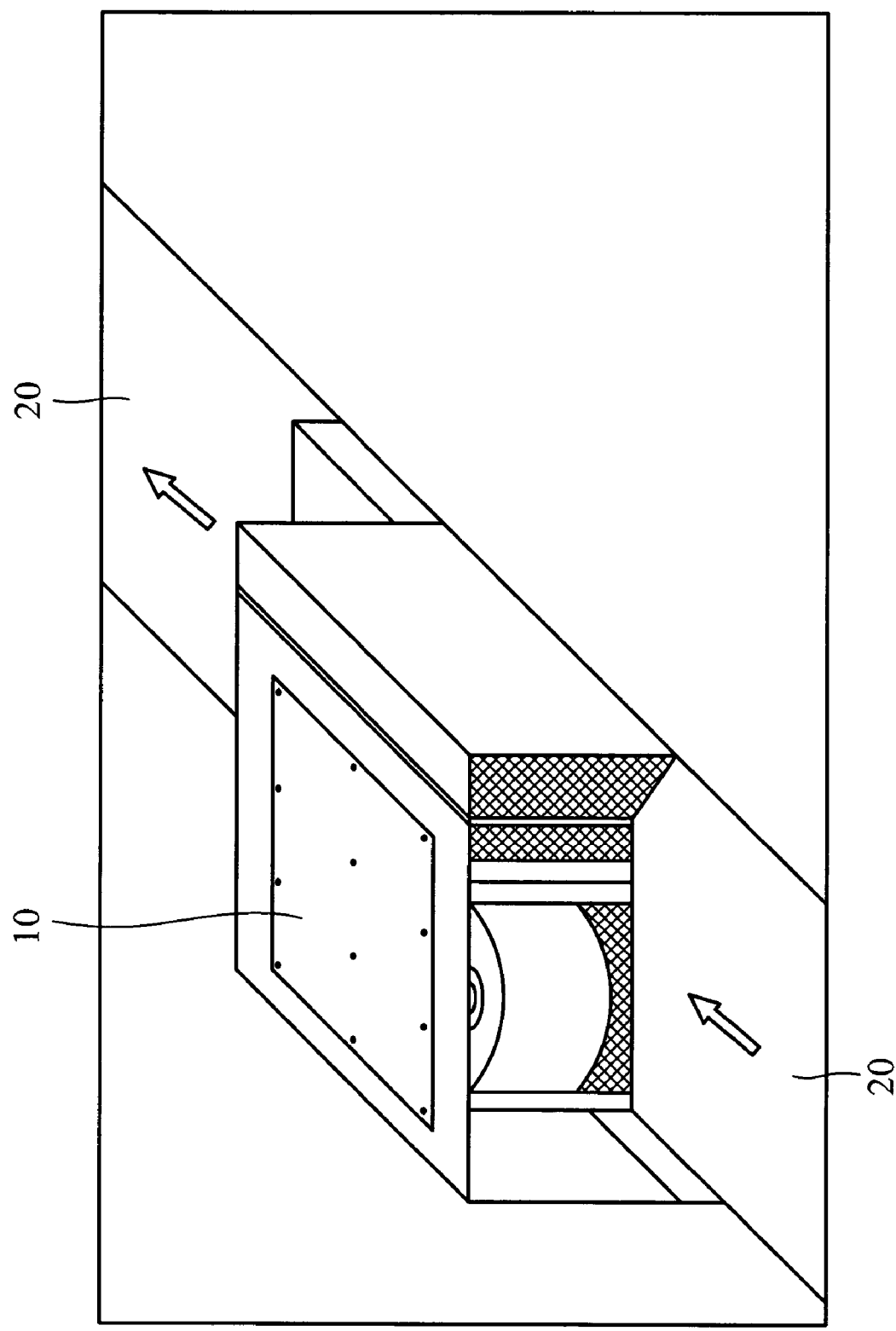
FIG. 1 is perspective view of an automatic air-blown cleaning apparatus for the LCD components in the LCD assembly process of the present invention.
Figure 2:
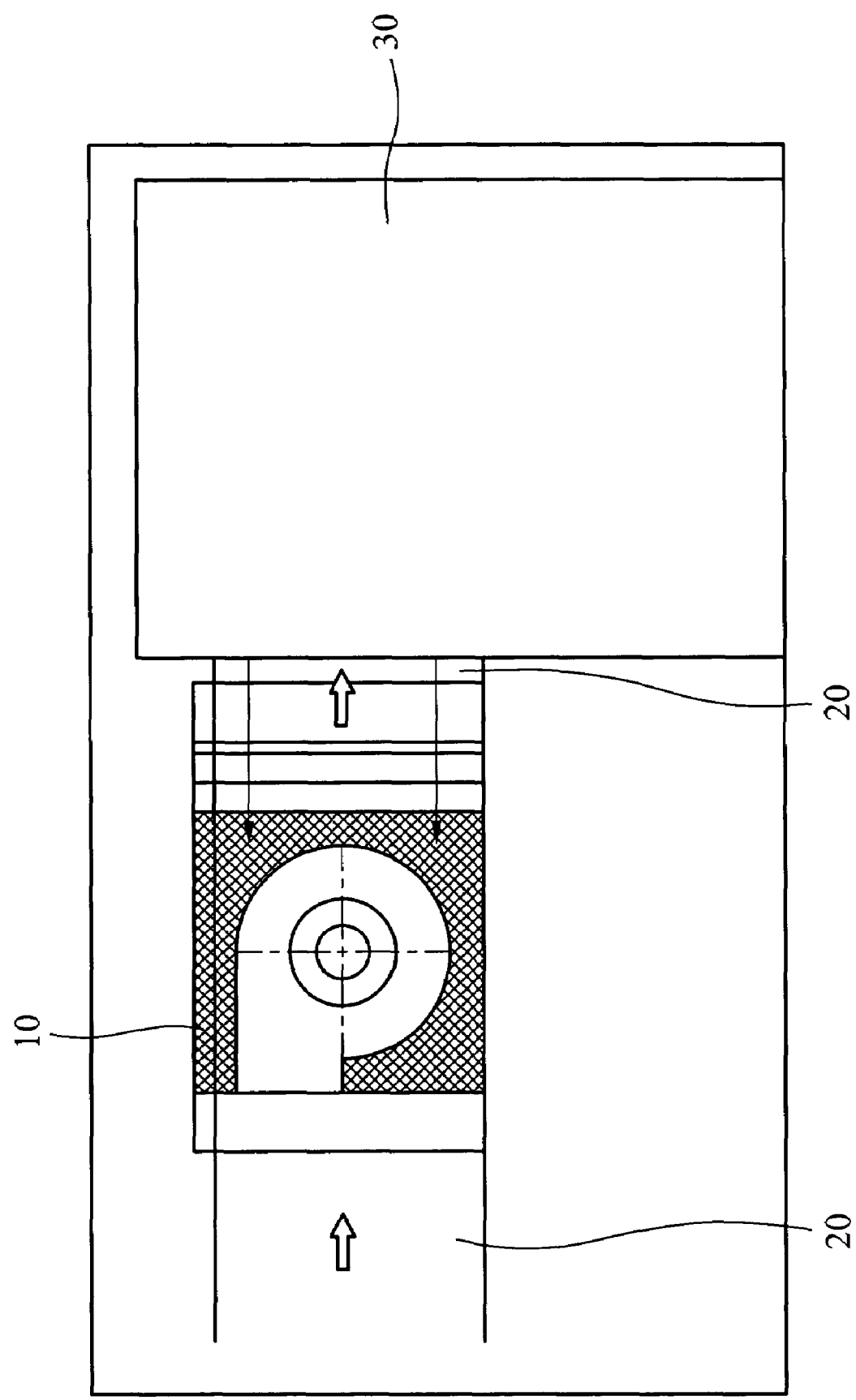
FIG. 2 is a top view of the automatic air-blown cleaning apparatus in FIG. 1.

FIG. 1 is a perspective view of an automatic air-blown cleaning apparatus for the LCD components in the LCD assembly process of the present invention, and FIG. 2 is a top view of the automatic air-blown cleaning apparatus in FIG. 1.

The automatic air-blown cleaning apparatus has an air filtering blower 10, a conveying device 20 and an assembly station 30. The assembly station 30 receives the LCD component, such as a liquid crystal panel or a backlight membrane, and performs LCD assembly. The conveying device 20 delivers the LCD component to the next assembly station 30, and the air filtering blower 10 is provided on the conveying device. The air filtering blower 10 sends an air flow toward the LCD component to remove residual matter from the LCD component.

Figure 3:
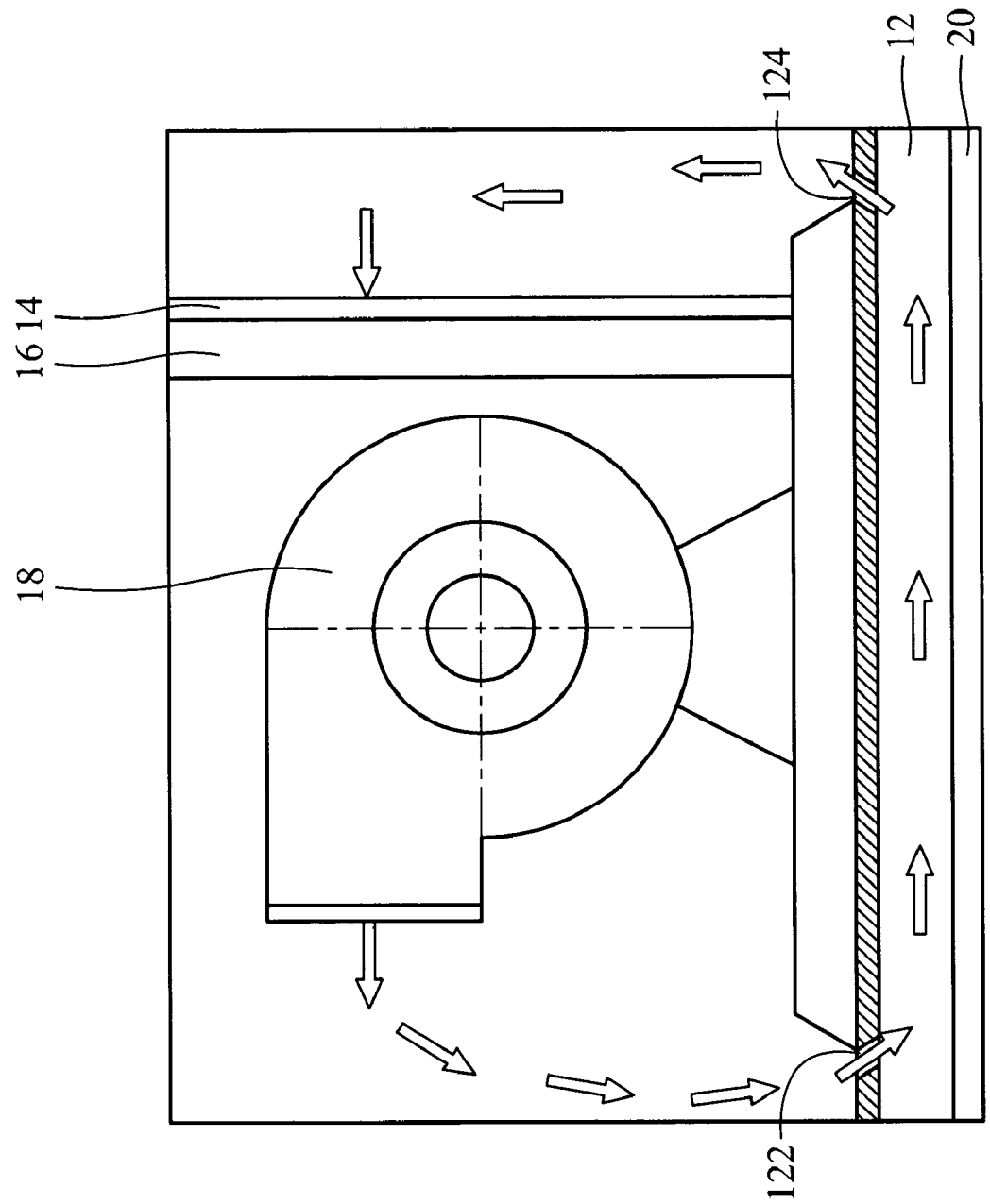
FIG. 3 is a schematic view of the circulated filtering blower 10 in FIG. 1.

The air filtering blower 10 in the embodiment is further illustrated in FIG. 3. According to FIG. 3, the air filtering blower 10 has a filter 14, a high efficiency colander 16 at a side of the filter 14, a blowing device 18 at an opposite side of the high efficiency colander 16 and the filter 14, an outlet 122 provided at an outgoing end of the air filtering blower 10 for sending the air flow toward the LCD component, and an inlet 124 provided at an incoming end of the air filtering blower 10 for receiving and circulating the air flow to the filter 14. Thus, the air flow is blown through a circulation path formed by the inlet 124, the filter 14, the high efficiency colander 16, the blowing device 18, and the outlet 122.

Generally, when the air flows rapidly, the residual matter filter 14 may be effectively removed. Accordingly, it is preferable to provide an air flow enhancing structure, e.g. a nozzle 122, at the outlet 122 to increase the air flow speed.

Figure 4:
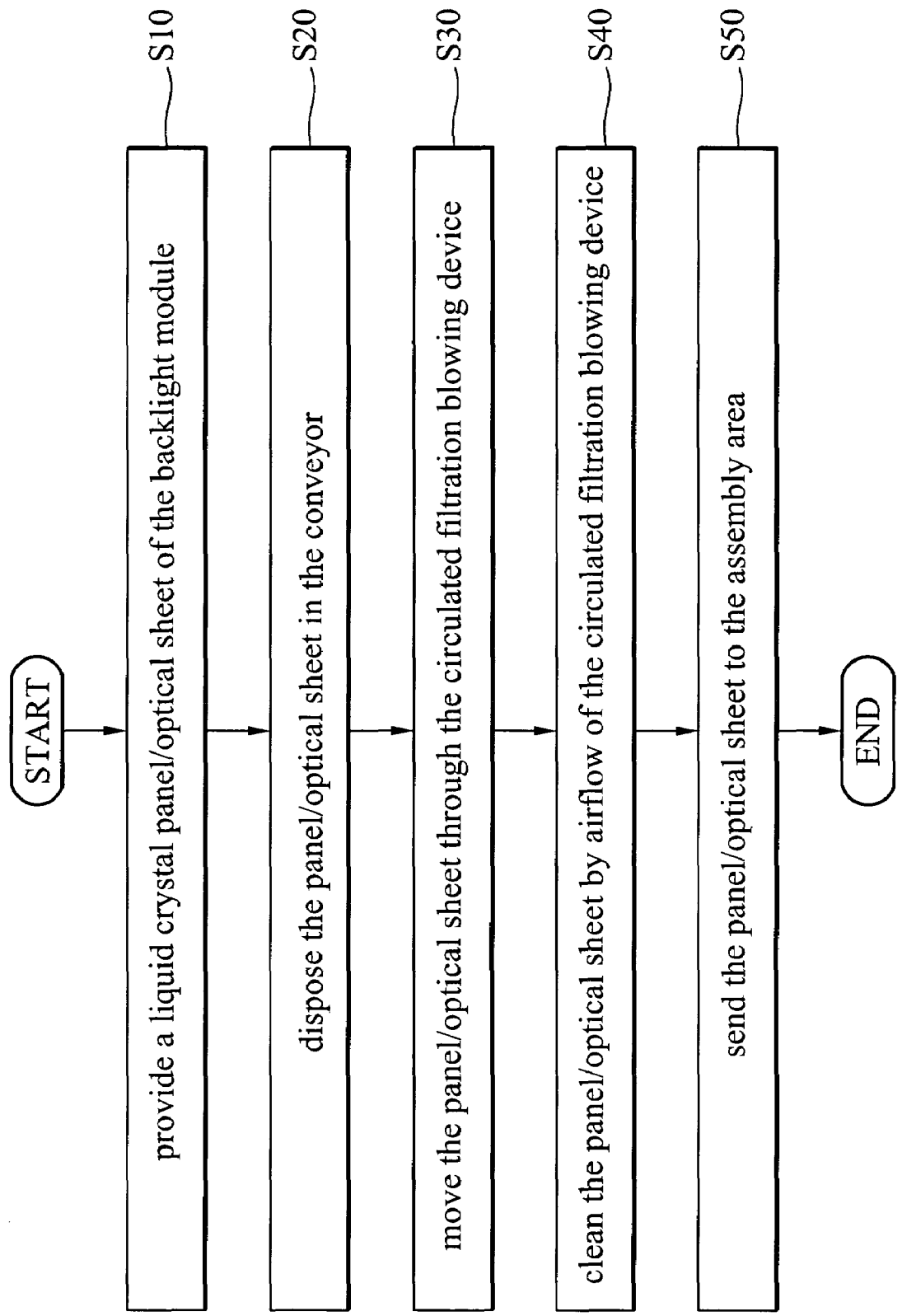
FIG. 4 is a flow chart showing the method of cleaning a liquid crystal display component for LCD assembly process of the present invention.

FIG. 4 is flow chart showing the method of cleaning a liquid crystal display component for the LCD assembly process of the present invention. The method of cleaning a liquid crystal display (LCD) component for the LCD assembly process of the present invention is hereinafter described according to FIG. 4.

According to the method of the present invention, a liquid crystal display component for assembly is provided (step S10). Then, the liquid crystal display component is disposed on the conveying device 20 having an air filtering blower 10 thereon (step S20). The liquid crystal display component is then delivered through the air filtering blower 10 (step S30) for removing residual matter from the liquid crystal display component with an air flow blown by the air filtering blower 10 (step S40). Finally, the cleaned liquid crystal display component is sent toward the next assembly station 30 to perform further LCD assembly (step S50).

It should be noted that, in the above-mentioned embodiment, the air flow is blown along the conveyed direction of the conveying device 20. However, it is also preferable that the air flow is blown in the conveyed direction of the conveying device.

With the automatic air-blown cleaning apparatus and the method of cleaning a liquid crystal display component for LCD assembly of the present invention, residual matter from the LCD components, such as the liquid crystal panel or the backlight membrane, can be cleaned in during conveyance without additional manual cleaning. The cleaning process can be controlled according to the air flow speed and the air flow rate of the air filtering blower 10. Accordingly, the present invention increases efficiency in the LCD assembly process, and reduces the manufacturing cost and time required by the LCD assembly process.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic air-blown cleaning apparatus for cleaning a liquid crystal display (LCD) component in an LCD assembly process, comprising:
   an assembly station for receiving and assembling the liquid crystal display component;
   a conveying device for delivering the liquid crystal display component to the assembly station; and
   an air filtering blower provided on the conveying device, the air filtering blower sending an air flow in a conveyed direction of the conveying device toward the liquid crystal display component to remove residual matter from the liquid crystal display component.

2. The automatic air-blown cleaning apparatus according to claim 1, wherein the air filtering blower comprises:
   a filter;
   a high efficiency colander at a side of the filter;
   a blowing device at an opposite side of the high efficiency colander and the filter;
   an outlet provided at an outgoing end of the air filtering blower for sending the air flow toward the liquid crystal display component; and
   an inlet provided at an incoming end of the air filtering blower for receiving and circulating the air flow to the filter;
   wherein the air flow is blown along a circulation path formed by the inlet, the filter, the high efficiency colander, the blowing device and the outlet.

3. The automatic air-blown cleaning apparatus according to claim 2, wherein the outlet comprises a nozzle.

4. The automatic air-blown cleaning apparatus according to claim 1, wherein the liquid crystal display component comprises a liquid crystal panel.

5. The automatic air-blown cleaning apparatus according to claim 1, wherein the liquid crystal display component comprises a backlight membrane.

* * * * *